June 12, 1945.  F. C. DULMAGE, JR., ET AL  2,378,291
LAMINAR STRUCTURE
Filed Dec. 31, 1942
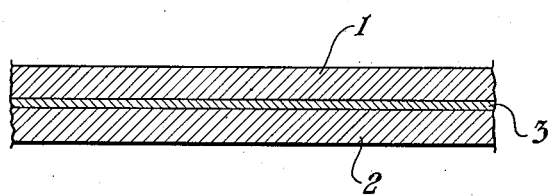
INVENTORS
Frederick C. Dulmage Jr.
BY Toivo A. Kauppi
Griswold & Burdick
ATTORNEYS Patented June 12, 1945

2,378,291

UNITED STATES PATENT OFFICE 2,378,291

LAMINAR STRUCTURE

Frederick C. Dulmage, Jr., and Toivo A. Kauppi, Midland, Mich., assignors to The Dow Chemical Company, Midland, Mich., a corporation of Michigan Application December 31, 1942, Serial No. 470,914

10 Claims. (Cl. 154—2)

This invention relates to a laminar structure and more particularly to a method for making a clear, laminar article of improved transparency and resistance to shattering.

Transparent plastic sheets are widely used for a number of purposes, such as for airplane windows, windshields and the like. Among the plastic materials used extensively in preparing such transparent sheets are the solid, high molecular weight polymers and copolymers of esters of acrylic and methacrylic acids herein designated for the sake of convenience simply as "acrylate polymers." The acrylate polymers, because they are light in weight, strong, clear, and do not darken upon continued exposure to light, are well suited to this use, but they have the serious disadvantage of being easily shattered when struck sharply enough to be broken, particularly at low temperatures. Many attempts have been made to bond sheets of acrylate polymers to sheets of tougher, more flexible, transparent plastic to produce laminar shatterproof structures, but the so-formed structures have not been entirely satisfactory. In some instances poor bonding of the sheets to each other is obtained, while in others discoloration occurs upon continued exposure of the structure to light. In still other instances, notably when it is attempted to laminate sheets of acrylate polymer with sheets of cellulose ethers which, as is well known, are flexible, tough, and light-stable and which may be prepared in highly transparent form, clouding or hazing in the region of the bond invariably occurs. This results in a product of poor transparency.

It is, therefore, an object of the present invention to provide a clear, transparent, laminar structure which is light-stable and proof against shattering when broken.

An additional object is to provide a laminar structure of high transparency and resistance to shattering at low temperatures, including sheets of acrylate polymer and of an organo-soluble cellulose ether.

An additional object is to provide a method for bonding a sheet of an acrylate polymer to an organo-soluble cellulose ether sheet to produce a laminar structure characterized by its light-stability, clarity, and high degree of transparency and by its resistance to shattering at low temperatures.

These and related objects are readily accomplished by first coating a cellulose ether sheet with a thin layer of a nitro cellulose composition compatible both with the cellulose ether and with the acrylate polymer and bonding the coated cellulose ether sheet to a sheet of acrylate polymer by means of a bonding agent including a liquid monomer or low molecular weight polymer or copolymer of acrylic and methacrylic esters under conditions of heat and pressure such that the bonding agent is converted to a solid, high molecular weight acrylate polymer.

Reference is made to the accompanying drawing which illustrates the article of the invention in an exaggerated scale. In the drawing, a film of cellulose ether 1 is shown bonded to an acrylate film 2 by means of an intermediate thin layer 3 of nitrocellulose composition compatible both with the cellulose ether and with the acrylate polymer.

Composite sheets or shaped laminar articles formed by the method of the invention are clear and transparent with no trace of haze or cloudiness in the region of the bond. Due to their laminar structure and the toughness and flexibility of the ethyl cellulose they are remarkably resistant to shattering when struck hard enough to rupture the sheet of acrylate polymer, even at temperatures as low as from —50 to —70° F. Laminar sheets of any desired thickness may be built up using alternate sheets of acrylate polymer and of cellulose ether. If desired, the acrylate polymer and cellulose ether sheets may themselves be of laminar construction, prepared by conventional methods well known in the art, thus insuring added strength and shatter-proofness to the composite structure. In any case, each surface of the cellulose ether sheet which is to be bonded to a sheet of acrylate polymer is coated with nitro cellulose as herein described. Laminar structures having an outer sheet of acrylate polymer on each side are resistant to oils and petroleum hydrocarbons. They may be finished with flat surfaces of good optical properties which are resistant to scratching and weathering. Not only may flat laminar articles be made by the process of the invention, but, by the use of properly molded, drawn or otherwise shaped sections of the acrylate polymer and of the cellulose ether, a wide variety of shaped composite articles may be formed. Although the process of the invention is particularly adapted to the preparation of structures of high transparency, it is equally applicable to the making of laminar structures in which either or both the acrylate polymer and cellulose ether contain fillers, dyes or other modifying agents which render them colored or opaque.

The preparation and forming of sheets of either acrylate polymer or of organo-soluble cellulose ethers, such as by casting, molding, drawing, laminating, etc., are well known in the art and need not be discussed in detail here. Sheets or formed shapes prepared by any of the known methods may be used in practicing the invention. The cellulose ether may, if desired, contain plasticizers to increase its toughness and flexibility as well as mold lubricants or other modifying agents, and the acrylate polymer may contain not only the polymers and copolymers of acrylic and methacrylic esters, but also agents frequently used to modify the properties of such sheets. Although any organo-soluble cellulose ether may be used, the invention is of particular value and will be described with respect to organo-soluble ethyl cellulose. Although the thickness of the ethyl cellulose sheet will depend to some extent upon the degree of shock which the laminar structure is intended to withstand, sheets 0.02 inch or more in thickness have been used to advantage.

Although the coating of nitro cellulose composition may be applied to the ethyl cellulose sheet in any desired manner, such as by bonding under heat and pressure, it is conveniently applied in the form of a solution in a volatile solvent followed by volatilization of the solvent. A low viscosity type of nitro cellulose may be used to advantage since by so doing a solution of relatively high nitro cellulose content may be prepared without its becoming too viscous to be applied evenly by brushing, dipping or spraying. If desired, multiple coats of the nitro cellulose may be applied. Among the plasticizers for the nitro cellulose which may be used to advantage may be mentioned dibutyl phthalate, the aromatic phosphates, butyl-phthalyl-butyl-glycolate and the like. In addition to a plasticizer other modifying agents may be incorporated in the solution, if desired, to render the coating tougher and more flexible. Although any solvent or solvent mixture in which the nitro cellulose and modifying agents are soluble may be used, mixtures are preferred in which the ethyl cellulose is only slowly soluble to avoid dissolving undue amounts of the ethyl cellulose sheet. It is preferable to select the solvent for the nitro cellulose composition and the conditions under which it is applied to the ethyl cellulose sheet so that little, if any, of the ethyl cellulose which may be dissolved diffuses through the nitro cellulose coating to where it may later come in contact with the acrylate polymer. Among other satisfactory solvents, mixtures of esters and aliphatic hydrocarbons have been used to advantage. After the solution of nitro cellulose has been applied on the surface of the ethyl cellulose sheet, the solvent is vaporized leaving a uniform coating of the nitro cellulose composition on the sheet. Coatings of the nitro cellulose composition from 0.0005 inch to 0.005 inch thick may be used to advantage, although thicker coatings may be used, if desired.

The coated ethyl cellulose sheet and the sheet of acrylate polymer are bonded together under heat and pressure using a thin layer of a liquid monomer or low molecular weight liquid polymer or copolymer of a lower alkyl ester of acrylic or methacrylic acid as a bonding agent. Although any liquid monomer or low molecular weight ploymer or copolymer of the class described may be used, it is preferable to use a monomer or polymer which when further polymerized will form a polymer of substantially the same composition as the acrylate polymer sheet which is to be bonded to the coated ethyl cellulose sheet. When liquid polymers are used they should be of sufficiently low molecular weight to permit their being spread in a thin uniform layer over the surface of the sheet of acrylate polymer or ethyl cellulose. The liquid bonding agent may be applied on the surface of either or both the acrylate polymer or the ethyl cellulose sheets. Sufficient of the bonding agent, which may be applied by spraying, dipping or in any other convenient manner, should be used to thoroughly wet the surface and to displace all of the air from between the sheets when the latter are pressed firmly together.

The bonding operation may be carried out in any convenient type of heated press which serves to press the sheets firmly together with the bonding agent distributed between them. Such pressing operations are well known in the art and will not be described here. The pressure need be maintained only until sufficient polymerization of the bonding agent has occurred to enable the structure to be handled without danger of the sheets separating, usually from 2 to 8 hours depending to some extent upon the temperature at which the operation is carried out and the degree of polymerization of the bonding agent used, and the heating may, if desired, then be continued in an oven or other suitable equipment thus releasing the press for further use. Although the pressure used will depend upon a number of factors, such as the number of sheets being bonded together, the thickness of the individual sheets, the shape of the finished structure desired, etc., only enough pressure is needed to press the sheets firmly together and to force out any air entrapped between the sheets. In the case of flat sheets, for example, pressures as low as from 5 to 15 pounds per square inch have been used. In the case of curved or irregular shaped structures higher pressures may be necessary.

The bonding operation may be carried out over a wide range of temperatures. Temperatures of from 100° to 250° F. may be used to advantage, although higher or lower temperatures may be used if desired. Polymerization of the bonding agent will occur at or slightly above room temperature although under such conditions an excessively long time may be required. The polymerization of the bonding agent may also be carried out at temperatures above 250° F. although if too high a temperature is used some discoloration or decomposition of the structure may result. When the temperature is maintained within the range of about 100° to about 250° F. the operation is complete in from 6 to 20 hours including the time of heating under pressure and the time of heating without pressure.

Certain advantages of the invention will be seen from the following example which is only by way of illustration and is not to be construed as limiting.

*Example*

A laminated ethyl cellulose sheet, formed by bonding together 6 sheets each .015 inch thick, was coated on each side with a solution consisting of 25 parts by weight of a mixture of 70 per cent by weight of ½ second nitro cellulose (65 per cent solids) and 30 per cent dibutyl phthalate dissolved in 75 parts by weight of a solvent mixture consisting of 12 per cent by volume of ethyl acetate, 12 per cent of butyl acetate, 49 per cent Solvesso No. 1 (an aromatic naphtha boiling at 94° to 135° C.), 10.5 per cent Troluoil (an aliphatic naphtha boiling at 94° to 122° C.), 8 per cent ethanol, and 8.5 per cent amyl acetate. The coated sheet was then dried thoroughly. Each surface of the ethyl cellulose sheet was thus coated with a dried layer of plasticized nitro cellulose about .0015 inch thick. The coated sheet was then wetted thoroughly with methyl methacrylate and placed between 2 clear transparent sheets of Lucite (a polymerized methyl methacrylate) each 0.15 inch thick. The assemblage of the 3 sheets was then placed in a heated press, equipped with a flat plate on one side and with an inflatable rubber lining on the other to insure a uniform pressure, and heated for 6 hours at a temperature of 150° F. under a pressure of 12 pounds per square inch. Upon removal from the press, the Lucite sheets were found to be bonded firmly to the ethyl cellulose sheet. The structure was then placed in an oven at atmospheric pressure and heated at 150° F. for an additional 8 hours to complete the polymerization of the bonding agent. The composite laminar structure which was about 0.39 inch thick was perfectly clear and transparent without any sign of hazing or cloudiness in the region of the bond. An exposed section of the composite sheet 13 inches square was tested for shatterproofness by cooling it to −50° F. and, while maintaining a pressure differential of about 10 pounds per square inch through the sheet, firing a high velocity fifty caliber bullet through it from the low pressure side. Very little cracking and substantially no shattering of the Lucite occurred around the hole formed by the bullet.

We claim:

1. A laminar structure as claimed in claim 2 wherein the sheet of high molecular weight acrylate polymer comprises a methacrylate polymer.

2. A shatterproof laminar structure including an organo-soluble cellulose ether sheet coated with nitro cellulose and having bonded to a coated surface thereof a sheet comprising a high molecular weight acrylate polymer selected from the class consisting of the polymers and copolymers of acrylic and methacrylic esters.

3. A laminar structure as claimed in claim 2 wherein the cellulose ether is ethyl cellulose.

4. A shatterproof laminar structure including an organo-soluble cellulose ether sheet coated with nitro cellulose and having bonded to a coated surface thereof with a bonding agent selected from the class consisting of the liquid monomers and low molecular weight polymers and copolymers of acrylic and methacrylic esters, a sheet comprising a high molecular weight acrylate polymer selected from the class consisting of the polymers and copolymers of acrylic and methacrylic esters.

5. A laminar structure as claimed in claim 4 wherein the cellulose ether is ethyl cellulose.

6. The method for making a shatterproof laminar structure which includes integrally bonding a sheet comprising a high molecular weight acrylate polymer selected from the class consisting of the polymers and copolymers of acrylic and methacrylic esters to a nitro cellulose coated surface of a cellulose ether sheet with a bonding agent selected from the class consisting of the liquid monomers and low molecular weight polymers and copolymers of acrylic and methacrylic esters by polymerizing the bonding agent in situ.

7. The method as claimed in claim 6 wherein the cellulose ether is ethyl cellulose.

8. The method as claimed in claim 6 wherein the sheet of high molecular weight acrylate polymer comprises a methacrylate polymer.

9. The method as claimed in claim 6 wherein the bonding agent is a methacrylate ester.

10. The method for making a shatterproof laminar structure which includes integrally bonding a preformed sheet comprising a high molecular weight methacrylate polymer to a preformed nitro cellulose coated surface of an ethyl cellulose sheet with a methacrylate ester monomer as a bonding agent by heating the bonding agent in situ at a temperature of from 100° to 250° F. under a pressure of from 6 to 20 pounds per square inch.

FREDERICK C. DULMAGE, Jr.
TOIVO A. KAUPPI.